Jan. 6, 1925.                                      1,521,963
C. A. McINTOSH
SUPPORT
Filed Feb. 15, 1922          2 Sheets-Sheet 1
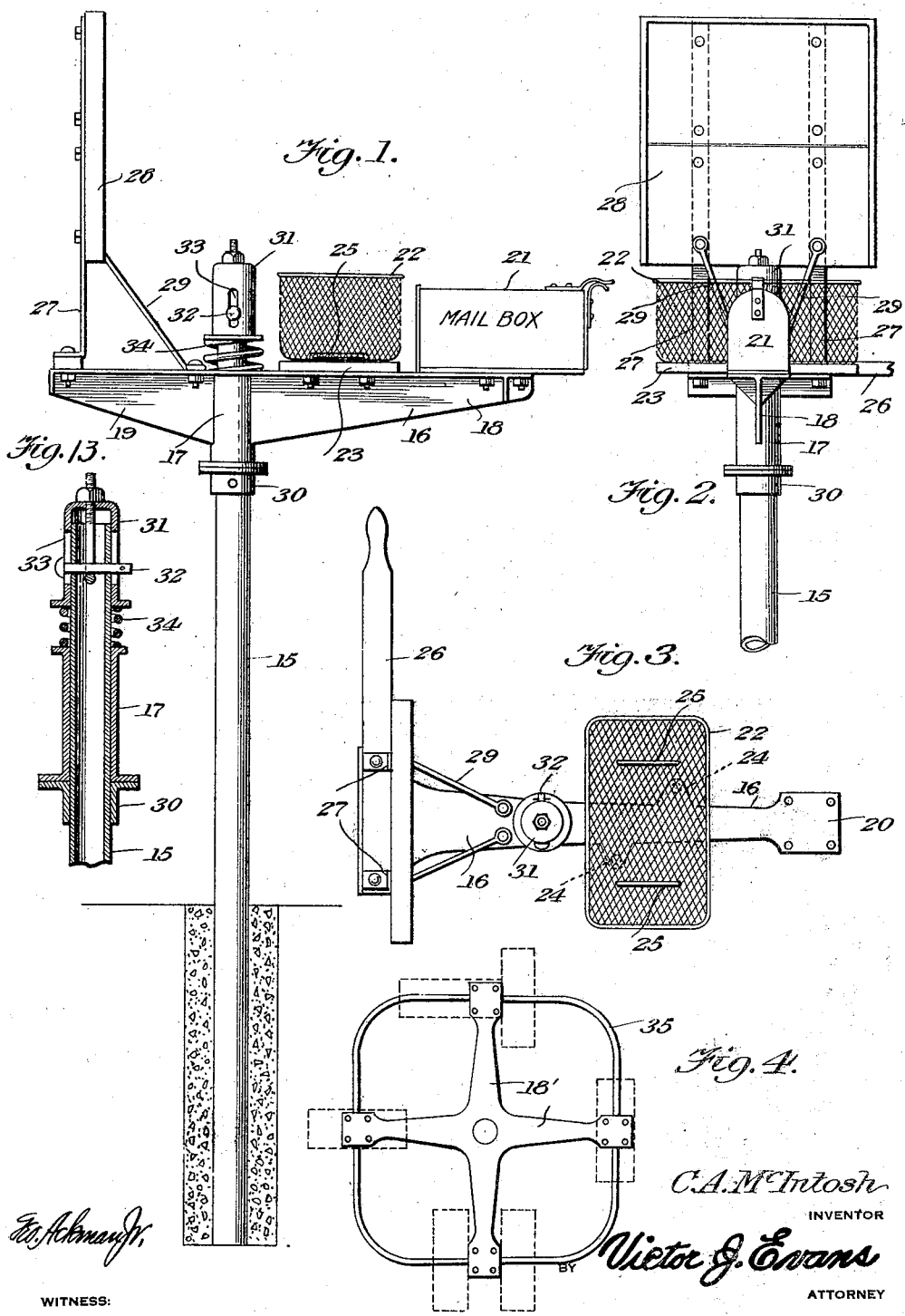

Jan. 6, 1925.
C. A. McINTOSH
SUPPORT
Filed Feb. 15, 1922
1,521,963
2 Sheets-Sheet 2
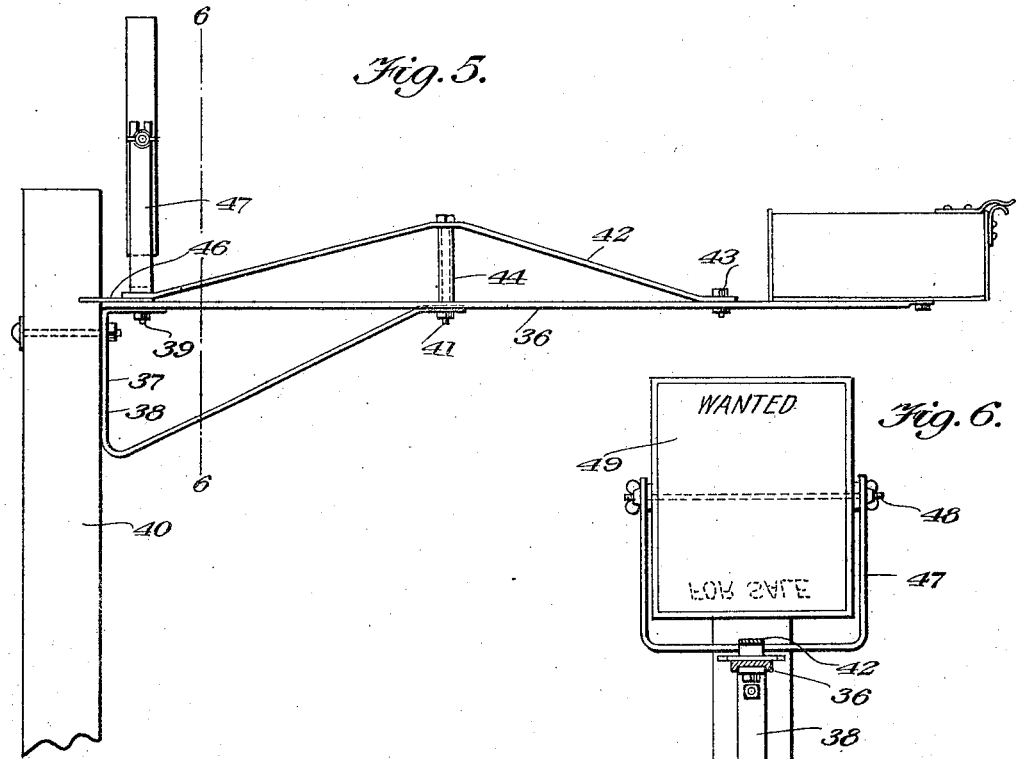
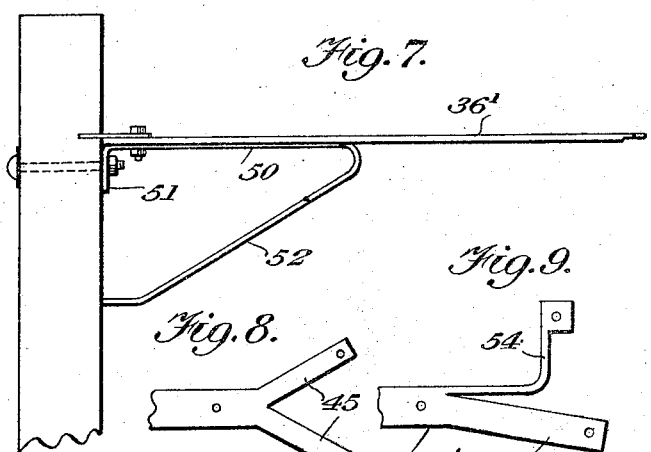
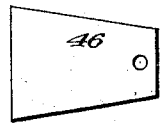
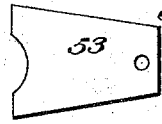
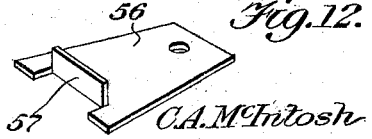
C. A. McIntosh
INVENTOR
BY Victor J. Evans
ATTORNEY
WITNESS:

Patented Jan. 6, 1925.

1,521,963

UNITED STATES PATENT OFFICE.

CLAYTON A. McINTOSH, OF PALMER, KANSAS.

SUPPORT.

Application filed February 15, 1922. Serial No. 536,839.

*To all whom it may concern:*

Be it known that I, CLAYTON A. McINTOSH, a citizen of the United States, residing at Palmer, in the county of Washington and State of Kansas, have invented new and useful Improvements in Supports, of which the following is a specification.

This invention relates to improvements in brackets, especially adapted for use in rural districts for supporting mail boxes, parcel post receptacles, bulletin boards and the like.

An object of the present invention is the provision of a bracket for the above purpose, which may be attached to an iron or wooden fence, or other post, and which may be supported in a manner to permit of rotation, or readily attached.

Another object of the invention is the provision of a bracket as above set forth, which is light and durable of construction and which may be easily and quickly secured in place.

With the above and other objects in view the invention further includes the following novel features and details of construction, to be hereinafter more fully described, illustrated in the accompanying drawings and pointed out in the appended claims.

In the drawings:—

Figure 1 is a side elevation of a bracket or support, constructed in accordance with the present invention.

Figure 2 is a view at right angles to Figure 1.

Figure 3 is a top plan view.

Figure 4 is a top plan view showing a modified form of the invention.

Figure 5 is a side elevation illustrating a further modified form of the invention.

Figure 6 is a sectional view on the line 6—6 of Figure 5.

Figure 7 is a side view illustrating another form of the invention.

Figure 8 is a fragmentary plan view showing one manner of forming the outer end of the bracket arm.

Figure 9 is a similar view illustrating another method of forming the outer end of this arm.

Figure 10 is a detail plan view showing the form of kerf plate used for attaching the bracket to a wooden post.

Figure 11 is a similar view illustrating the form of plate used in connection with a cylindrical post or pipe.

Figure 12 is a detail perspective view of another form of kerf plate.

Figure 13 is an enlarged fragmentary sectional view through the upper end of the support.

Referring in detail to the drawings, and more especially to Figures 1 to 3 inclusive, the bracket or support is shown as mounted upon a cylindrical post 15, which may be formed of pipe, if desired. This post may constitute a part of a fence and the bracket arm 16 which is mounted thereon and which is capable of rotation, includes a sleeve 17 having arms 18 and 19 extending from diametrically opposite sides thereof. These arms may be cast integral with the sleeve 17 and may be of any transverse configuration to insure strength and lightness. The arm 18 is provided at its outer end with an enlargement or shelf 20, having suitable openings therein, for the reception of fastening devices for the purpose of securing a mail box 21 or other receptacle thereto.

Also adapted to be secured to the arm 18 is a receptacle, herein shown in the form of a basket 22, which may conveniently receive parcel post matter. This basket is mounted on a transversely arranged plate or base 23, which is bolted or otherwise secured to oppositely extending ears 24 which project from the edges of the arm 18. The basket is secured to the plate or base 23 by means of U-bolts 25. The arm 19 has bolted to its outer end a handle 26 and extending upwardly from this arm and secured thereto by the bolts which secure the handle to the arm 19 are spaced vertically disposed arms 27. Bolted or otherwise secured to the arms 27 is a bulletin board 28 whose face is parallel with the length of the handle 26. The bulletin board is securely held in place through the medium of inclined braces 29.

The sleeve 17 is supported upon the post 15 by means of a flanged collar 30 and the upper end of this post is provided with an adjustable cap 31, which is held in adjusted position by means of a screw or bolt 32 which passes through a slot 33 formed in the cap. Surrounding the post 15 between the inner end of the cap 13 and the upper end of the sleeve 17 is a spring 34, the tension of which may be adjusted through the adjustment of the cap 31, the purpose being to prevent accidental rotation of the bracket.

In the use of the invention, the arm 18 may be normally positioned on the outside of the fence with the handle 26 parallel to the fence so that the householder may by grasping the handle easily rotate the bracket to a convenient position for removing mail or other packages and may then return the bracket to its original position. The tension of the spring will prevent the bracket from being accidently moved out of position. As the bulletin board 28 is arranged parallel to the length of the handle, notices, such as the sale of produce, or any other matter, may be easily read by passers by.

In some communities it is desirable to position a number of mail boxes at a single point along a pike or State road and in order that these boxes may be easily reached without forcing the carrier to alight from his vehicle, the construction provided in Figure 4 had been devised. This consists of a plurality of radially arranged bracket arms 18', to the outer ends of which may be secured one or more mail boxes, as shown by dotted lines. These boxes may be secured as in the manner previously described, or in any other suitable or desired manner. The arms 18 are mounted for rotation upon a post in the manner described in connection with the preceding figures and in order to provide means for conveniently rotating the bracket so as to bring any of the arms into convenient position, the outer ends of the said arms are connected by an angular strip or rod 35, which not only serves as a handle, but further serves to strengthen the outer ends of the arms and to provide additional means by which the mail boxes shown by dotted lines in Figure 4 may be attached.

In Figures 5 and 6 of the drawings there is illustrated a form of bracket or support which may be formed of strap metal, angle iron, channel iron or I beams. This form of the invention is designed for use where it is necessary or desired to employ a relatively long arm. The form shown consists of a bar 36 to the inner end of which is secured a brace 37. This brace includes a substantially vertical portion 38, whose upper end is bent at a right angle beneath the inner end of the bar 36 to which it is secured by means of a bolt or screw 39. The arm 38 is adapted to bear against a wooden or other post 40 and its lower end is bent upward and outward and is secured to the bar 36 intermediate the ends of the latter by means of a bolt 41. To further strengthen the bar 36 there is provided a truss brace which includes a longitudinally extending rod 42, one end of which is secured to the inner end of the bar 36 upon the bolt 39, while its opposite end is secured adjacent the outer end of the bar 36 as shown at 43. The vertically arranged arm 44 connects the bar 36 and the rod 42 intermediate their ends, the lower end of the arm 44 being secured upon the bolt or other securing means 41.

The outer end of the bar 36 is longitudinally split as illustrated in Figure 8 of the drawings so as to provide outwardly extending spaced arms 45, which serve as a platform or rest for the support of a mail box or other receptacle.

Located at the inner end of the bracket is what may be termed a kerf plate 46, the latter being provided with an opening for the reception of the bolt 39. This plate is adapted to be positioned between the bar 36 and the rod 42 and to have its inner end received within a horizontally arranged kerf provided in the post 40.

Also secured upon the bolt 39 is a substantially U-shaped bracket 47. The upper ends of this bracket are slitted for the reception of a pivot bolt 48 and mounted upon this bolt is a bulletin board 49. This board may have suitable indicia arranged upon one or both sides, for example the word "Wanted" may be arranged at the top upon one side of the board and bulletins describing articles wanted may be writen or otherwise arranged therebeneath. Upon the opposite side of the board and at the bottom may be arranged the words "For sale" and by rotating the board upon the pivot 48, the former may be reversed and suitable bulletins arranged beneath these words.

In Figure 7 there is illustrated a slightly different form of the invention. In this form the truss brace is dispensed with, as the arm is of a relatively short length. The lower brace is of a slightly different character being somewhat the shape of the brace 37 shown in Figures 5 and 6. That is, it includes an arm 50, which in Figure 7 is horizontally arranged beneath the bracket arm or bar 36'. The inner end of the arm 50 is bent at a right angle as shown at 51 for contact with the side of the post, while the opposite end of the said arm 50 is bent inward and downward as shown at 52 and its extremity is adapted to engage the post beneath the right angled portion 51. Any suitable type of kerf plate may be employed, depending upon the type of post used, for example, the plate 53 which is shown in Figure 11 and which is designed for use in connection with a cylindrical post or pipe. The plate illustrated in Figure 10 is designed for use in connection with a wooden post.

The outer end of the bar 36' may be formed in the manner illustrated in Figure 8, or it may be longitudinally split as shown in Figure 9, the outer end of the split portion extending at right angles so as to provide a right angled offset arm 54 and an inclined offset arm 55.

In the form of kerf plate shown in Figure 12 and indicated at 56, the inner edge of the said plate is slitted and the portion between the slits bent at right angles as shown at 57 so as to provide a flange. This flange may be of a length co-extensive with the width of the base to which the plate 56 is secured and the said flange may then lie flat against the face of the post.

The invention is susceptible of various changes in its form, proportions and minor details of construction and the right is therein reserved to make such changes as properly fall within the scope of the appended claims.

Having described the invention what is claimed is:—

1. In combination with a post, of a sleeve rotatably supported thereon, a horizontal support carried by the post, a cap received on the upper end of the post provided with slots at diametrically opposite points, a pin passing through the slots and post, a yoke carried by the cap and engaging the pin, a spring interposed between the cap and sleeve, and a receptacle supported on the horizontal member.

2. A device of the character described comprising a post, a sleeve rotatably supported thereon, a horizontal arm carried by the sleeve, a cap on the post having slots at diametrically opposite points, a pin passing through the post and slots, a yoke extending from the cap engaging the pin and a coil spring interposed between the cap and sleeve to normally hold the same against rotation, a receptacle supported on the arm, and a handle carried by the arm whereby to rotate, the arm about its axis.

In testimony whereof I affix my signature.

CLAYTON A. McINTOSH.